(12) United States Patent
Son et al.

(10) Patent No.: US 7,719,652 B2
(45) Date of Patent: May 18, 2010

(54) ARRAY SUBSTRATE FOR IN-PLANE SWITCHING LIQUID CRYSTAL DISPLAY DEVICE AND METHOD OF FABRICATING THE SAME

(75) Inventors: Hyeon-Ho Son, Gyeonggi-do (KR); Heum-Il Baek, Seoul (KR)

(73) Assignee: LG Display Co., Ltd., Seoul (KR)

( * ) Notice: Subject to any disclaimer, the term of this patent is extended or adjusted under 35 U.S.C. 154(b) by 409 days.

(21) Appl. No.: 11/488,075

(22) Filed: Jul. 18, 2006

(65) Prior Publication Data

US 2006/0256269 A1 Nov. 16, 2006

Related U.S. Application Data

(63) Continuation of application No. 10/875,575, filed on Jun. 25, 2004, now Pat. No. 7,139,058.

(30) Foreign Application Priority Data

Dec. 10, 2003 (KR) .......................... 2003-0089748

(51) Int. Cl.
*G02F 1/1343* (2006.01)
(52) U.S. Cl. ...................................... 349/141; 349/145
(58) Field of Classification Search .................. 349/141
See application file for complete search history.

(56) References Cited

U.S. PATENT DOCUMENTS

| 5,745,207 | A | | 4/1998 | Asada et al. |
| 5,757,452 | A | | 5/1998 | Masaki et al. |
| 6,128,061 | A | * | 10/2000 | Lee et al. ..................... 349/141 |
| 6,608,662 | B1 | * | 8/2003 | Hiroshi ....................... 349/141 |
| 6,665,023 | B1 | * | 12/2003 | Watanabe et al. ............. 349/38 |
| 2002/0154079 | A1 | | 10/2002 | Shiota et al. |

* cited by examiner

*Primary Examiner*—David Nelms
*Assistant Examiner*—W. Patty Chen
(74) *Attorney, Agent, or Firm*—Morgan Lewis & Bockius LLP

(57) ABSTRACT

An array substrate for an in-plane switching liquid crystal display device includes a substrate, gate lines arranged in a first direction on the substrate, data lines crossing the gate lines to define a pixel region, the pixel region consists of four sub-pixel regions, a switching element at the crossing of the gate and data lines, a pixel electrode in each of the sub-pixel regions, and a common electrode alternatively arranged with the pixel electrode to form a plurality of blocks in each of the sub-pixel regions. Two of the sub-pixel regions include an n-number of blocks (n is a natural number). Two of the sub-pixel regions include an (n+2)-number of blocks.

6 Claims, 12 Drawing Sheets

ARRAY SUBSTRATE FOR IN-PLANE SWITCHING LIQUID CRYSTAL DISPLAY DEVICE AND METHOD OF FABRICATING THE SAME

This application is a Continuation of U.S. patent application Ser. No. 10/875,575, filed Jun. 25, 2004 now U.S. Pat. No. 7,139,058, and invention claims the benefit of Korean Patent Application No. 2003-0089748 filed in Korea on Dec. 10, 2003, which is are hereby incorporated by reference in their entirety.

BACKGROUND OF THE INVENTION

1. Field of the Invention

The present invention relates to a liquid crystal display device, and more particularly, to an array substrate for an in-plane switching (IPS) liquid crystal display device having high brightness and a method of fabricating the same.

2. Discussion of the Related Art

A liquid crystal display device uses the optical anisotropy and polarization properties of liquid crystal molecules to produce an image. Liquid crystal molecules have a definite alignment as a result of their long, thin shapes. That alignment direction can be controlled by applying an electric field. Specifically, variations in an applied electric field, influence the alignment of the liquid crystal molecules. Due to the optical anisotropy, the refraction of incident light depends on the alignment direction of the liquid crystal molecules. Thus, by properly controlling the applied electric field, an image which has a desired brightness can be produced.

Of the different types of known liquid crystal displays (LCDs), active matrix LCDs (AM-LCDs), which have thin film transistors (TFTs) and pixel electrodes arranged in a matrix form, are the subject of significant research and development because of their high resolution and superior ability in displaying moving images. Further, LCD devices have wide application in office automation (OA) equipment and video units because they are light and thin and consume low power.

A typical liquid crystal display panel has an upper substrate, a lower substrate and a liquid crystal layer interposed therebetween. The upper substrate is commonly referred to as a color filter substrate. The upper substrate usually includes a common electrode and color filters. The lower substrate is commonly referred to as an array substrate. The lower substrate includes switching elements, such as thin film transistors, and pixel electrodes.

As previously described, LCD device operation is based on the principle that the alignment direction of the liquid crystal molecules is dependent upon an electric field applied between the common electrode and the pixel electrode. The electric field applied to the liquid crystal layer controls the alignment direction of the liquid crystal molecules. When the alignment direction of the liquid crystal molecules is properly adjusted, incident light is refracted along the alignment direction to display image data. The liquid crystal molecules function as an optical modulation element having variable optical characteristics that depend upon a polarity of the applied voltage.

In an LCD device according to the related art, the pixel and common electrodes are positioned on the lower and upper substrates, respectively. The electric field induced between the pixel and common electrodes is perpendicular to the lower and upper substrates. However, the related art LCD devices have a narrow viewing angle because of the longitudinal electric field.

In order to solve the problem of narrow viewing angle, in-plane switching liquid crystal display (IPS-LCD) devices have been proposed. An IPS-LCD device includes a lower substrate, an upper substrate and a liquid crystal. A pixel electrode and a common electrode are disposed on the lower substrate. The upper substrate has no electrode. The liquid crystal is interposed between the upper and lower substrates.

Figure 1:
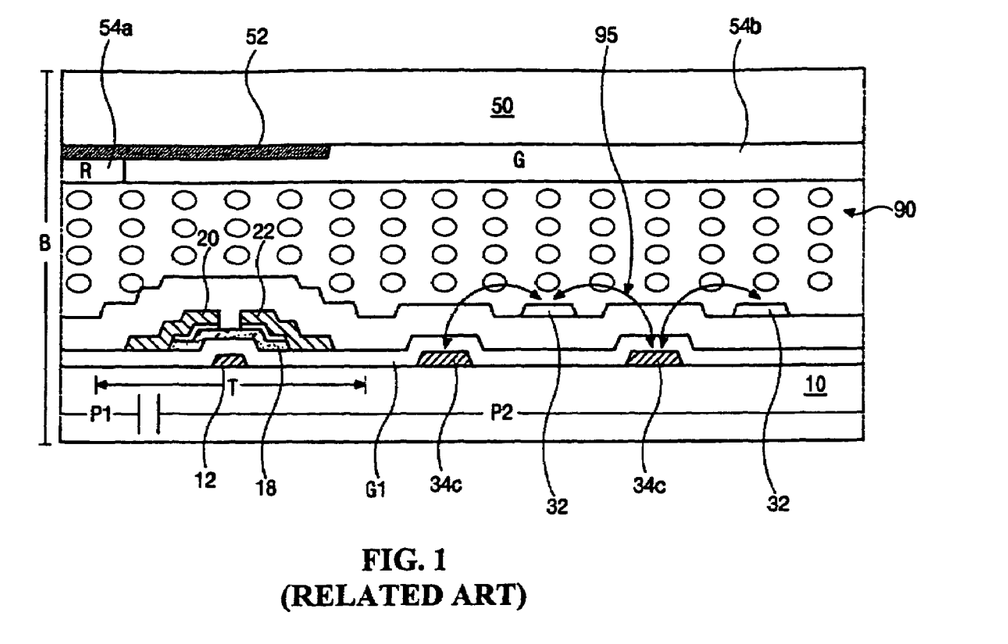
FIG. 1 is a cross-sectional view of an IPS-LCD device according to the related art.

FIG. 1 is a cross-sectional view of an IPS-LCD device according to the related art. As shown in FIG. 1, first and second substrates 10 and 50 are spaced apart from each other. A liquid crystal layer 90 is interposed the first and second substrates. The first and second substrates 10 and 30 are often referred to as an array substrate and a color filter substrate, respectively.

A thin film transistor T, a common electrode 34c and a pixel electrode 32 are formed on an inner surface of the first substrate 10 in each pixel P1 and P2. The thin film transistor T includes a gate electrode 12, a semiconductor layer 18, a source electrode 20 and a drain electrode 22. A gate insulating layer G1 is formed between the gate electrode 12 and the semiconductor layer 18. The source electrode 20 and the drain electrode 22 are spaced apart over the semiconductor layer 18.

The common electrode 34c and the pixel electrode 32 are aligned parallel to and spaced apart from each other over the first substrate 10. Generally, the common electrode 34c is formed of the same material as the gate electrode 12. Similarly, the pixel electrode 32 is formed of the same material as the source and drain electrodes 20 and 22. However, to improve an aperture ratio, the pixel electrode 32 may be formed of a transparent conductive material as shown.

Although not shown in the figure, a gate line, a data line and a common line are formed. The gate line extends along a side of the pixels P1 and P2. The data line is formed along a direction crossing the gate line. The common line is connected to the common electrode 34c and parallel to the gate line.

A black matrix 52 is formed on an inner surface of the second substrate 50. The black matrix 52 corresponds to the gate line, the data line and the thin film transistor T.

A color filter layer 54a and 54b is formed on the inner surface of the second substrate 50. The color filter layer 54a and 54b includes three sub-color filters of red, green and blue colors. Each sub-color filter 54a and 54b corresponds to each pixel P1 and P2.

Liquid crystal molecules of the liquid crystal layer 90 are aligned by an electric field 95. The electric field 95 is induced between the common electrode 34c and the pixel electrode 32 parallel to the substrates 10 and 50.

Figure 2:
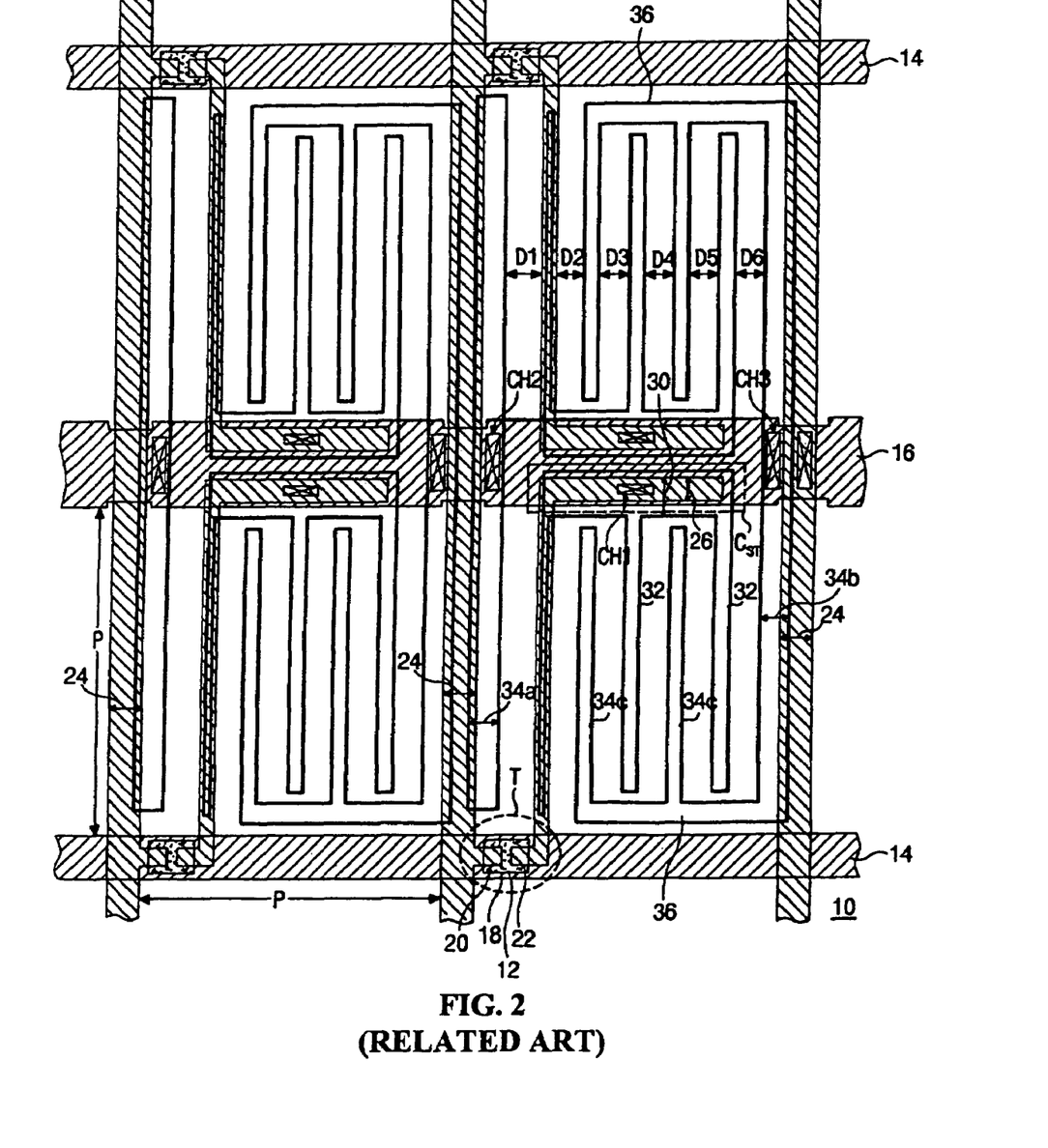
FIG. 2 is a plan view of an array substrate of an IPS-LCD device according to the related art.

FIG. 2 is a plan view of an array substrate of an IPS-LCD device according to the related art. As shown in FIG. 2, a plurality of gate lines 14 are formed on a substrate 10. A common line 16 is formed between adjacent gate lines 14 parallel to the gate lines 14. A plurality of data lines 24 are extended in a direction perpendicular to the gate lines 14 and the common line 16 and are spaced apart from each other. The data lines 24 define sub-pixels P by crossing the gate lines 14 and the common line 16.

A thin film transistor T is formed at one side of the sub-pixel P. The thin film transistor T includes a gate electrode 12, an active layer 18, a source electrode 20 and a drain electrode 22. The drain electrode 22 has an extension part 26, which is extended over the common line 16.

A common electrode 34a, 34b, 34c and 36 and a pixel electrode 30 and 32 are formed in the sub-pixel P. The pixel electrode includes a horizontal portion 30. The horizontal portion 30 is connected to the extension part 26 through a first contact hole CH1 and a plurality of vertical portions 32. The vertical portions 32 are vertically extended from the horizontal portion 30. The extension part 26 and a part of the common line 16 overlapping each other constitute a storage capacitor $C_{ST}$. The extension part 26 represents a first electrode and the part of the common line 16 represents a second electrode of the storage capacitor $C_{ST}$.

The common electrode 34a, 34b, 34c and 36 includes a first vertical part 34a, a second vertical part 34b, a plurality of third vertical parts 34c and a horizontal part 36. The first and second vertical parts 34a and 34b are disposed along both sides of the sub-pixel P and are connected to the common line 16 through second and third contact holes CH2 and CH3, respectively. The first and second vertical parts 34a and 34b are extended over two sub-pixels P that are vertically adjacent. The plurality of third vertical parts 34c are alternatively arranged with the vertical portions 32 of the pixel electrode. The horizontal part 36 is connected to the plurality of third vertical parts 34c and the second vertical part 34b. Here, the second vertical part 34b vertically contacts both the horizontal parts 36 of the adjacent sub-pixels P.

In the above-mentioned array substrate, 6 blocks D1, D2, D3, D4, D5, and D6 are formed in one sub-pixel P. The 6 blocks D1, D2, D3, D4, D5, and D6 are defined as spaces between the vertical parts 34a, 34b and 34c of the common electrode and the vertical portions 32 of the pixel electrode.

Meanwhile, as shown in FIG. 2, in the case of a quad type device, which includes red, green, blue and white sub-pixels, one pixel includes four sub-pixels, which are mutually adjacent vertically or horizontally.

In the IPS-LCD device, to cover influences from the data line 24, the common electrode 34a and 34b should be close to the data line 24. Accordingly, the number of blocks between the common electrode 34a, 34b and 34c and the pixel electrode 32 may be an even number.

Table 1 shows widths of elements in designing an array substrate for a related art IPS-LCD device including a sub-pixel of 6 blocks.

TABLE 1

| Blocks | 6 |
|---|---|
| Width of gate line | 16 μm |
| Width of data line | 20 μm |
| Width of pixel electrode | 4.5 μm |
| Distance between data line and common electrode | 4.5 μm |
| Width of outer common electrode | 9.0 μm |
| Space between electrodes | 12.0 μm |
| Aperture ratio | 31.90 |

The IPS-LCD device having the conditions of Table 1 corresponds to a 15 inch XGA (extended graphics array) model. Here, the data line having a width of about 20 μm reduces an aperture area. Thus, the data line may have a maximum effective width of about 10 μm.

An aperture area is expanded as the number of blocks increases. However, although the width of the data line decreases, the number of blocks does not increase. Moreover, widths of the common electrode 34c and the pixel electrode 32 may decrease. Spaces between the electrodes may also decrease. Accordingly, the maximum efficiency cannot be obtained. Specifically, if the widths of the common electrode 34c and the pixel electrode 32 decrease sharply while the spaces between the electrodes have an effective value, it is likely that the electrodes are down during the manufacturing processes. If the spaces between the electrodes decrease, the increase in number of blocks is offset by the narrowing of the spaces. Accordingly, the aperture area is not increased.

To increase the aperture area, more blocks, such as 7 blocks, may be formed. However, since the common electrode should be near by the data line, the sub-pixel that includes 7 blocks cannot be formed. Thus, the sub-pixel should include an even number of blocks.

Therefore, although the above-structure array substrate can have a wider aperture area, the lines and the electrodes may have somewhat broad widths due to even blocks. Accordingly, a higher aperture ratio cannot be obtained.

SUMMARY OF THE INVENTION

Accordingly, the present invention is directed to an array substrate for an in-plane switching liquid crystal display device having high brightness and a method of fabricating the same that substantially obviates one or more of the problems due to limitations and disadvantages of the related art.

An object of the present invention is to provide an array substrate for an in-plane switching liquid crystal display device that has a high aperture ratio.

Another object of the present invention is to provide a method of fabricating an array substrate for an in-plane switching liquid crystal display device that has a high aperture ratio.

Another object of the present invention is to provide an array substrate for an in-plane switching liquid crystal display device that has a high brightness.

Another object of the present invention is to provide a method of fabricating an array substrate for an in-plane switching liquid crystal display device that has a high brightness.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages, and in accordance with the purpose of the present invention, as embodied and broadly described, the array substrate for in-plane switching liquid crystal display device includes a substrate, gate lines arranged in a first direction on the substrate, data lines crossing the gate lines to define a pixel region, the pixel region consists of four sub-pixel regions, a switching element at the crossing of the gate and data lines, a pixel electrode in each of the sub-pixel regions, and a common electrode alternatively arranged with the pixel electrode to form a plurality of blocks in each of the sub-pixel regions, wherein two of the sub-pixel regions include an n-number of blocks, and two of the sub-pixel regions include an (n+2)-number of blocks (n is a natural number).

In another aspect, the method of fabricating an array substrate for an in-plane switching liquid crystal display device includes forming gate lines on a substrate, forming data lines crossing the gate lines to define a pixel region, the pixel region including four sub-pixel regions, forming a switching element at a crossing of the gate and data lines, forming a pixel electrode in each of the sub-pixel regions, and forming a common electrode alternatively arranged with the pixel electrode to form a plurality of blocks in the sub-pixel region, wherein two of the sub-pixel regions include an n-number of blocks, and two of the sub-pixel regions include an (n+2)-number of blocks (n is a natural number).

In another aspect of the present invention, the array substrate for an in-plane switching liquid crystal display device includes gate lines arranged in a first direction on a substrate, data lines crossing the gate lines to define a pixel region, a switching element at a crossing of the gate and data lines, a pixel electrode in the pixel region, and a common electrode alternatively arranged with the pixel electrode, wherein a first area of the pixel region includes an n-number of blocks (n is natural number) and a second area of the pixel region includes a (2n+2)-number of blocks.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the present invention and together with the description serve to explain the principles of that invention. In the drawings:

FIGS. 5A to 5E are exemplary cross-sectional views along the line V-V of FIG. 3 according to an embodiment of the present invention;

FIGS. 6A to 6E are exemplary cross-sectional views along the line VI-VI of FIG. 3 according to an embodiment of the present invention;

FIGS. 7A to 7E are exemplary cross-sectional views along the line VII-VII of FIG. 3 according to an embodiment of the present invention.

DETAILED DESCRIPTION OF THE ILLUSTRATED EMBODIMENTS

Reference will now be made in detail to an illustrated embodiment of the present invention, examples of which are shown in the accompanying drawings.

Figure 3:
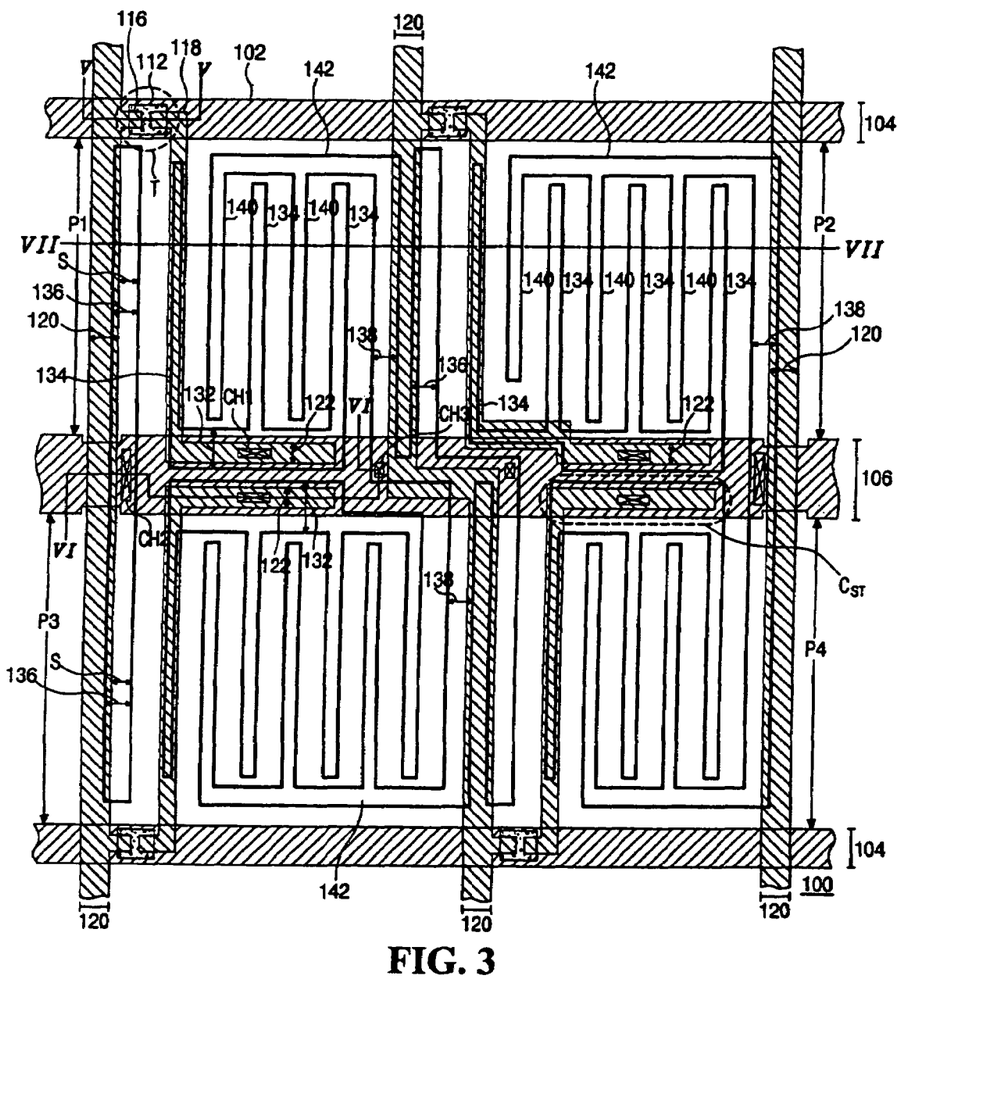
FIG. 3 is a plan view of an exemplary array substrate for an IPS-LCD device according to a first embodiment of the present invention.

FIG. 3 is a plan view of an exemplary array substrate for an IPS-LCD device according to a first embodiment of the present invention. In the first embodiment, the IPS-LCD device is a quad type device, in which red, green, blue and white sub-pixels are arranged up and down and left and right neighboring each other. Two adjacent sub-pixels have 6 blocks and 8 blocks, respectively.

As shown in FIG. 3, a plurality of gate lines 104 are formed on a substrate 100. The plurality of gate lines 104 are spaced apart from and parallel to each other. A common line 106 is formed between adjacent gate lines 104 parallel to the gate lines 104. A plurality of data lines 120 are extended in a direction perpendicular to the gate lines 104 and the common line 106 to cross the gate lines 104 and the common line 106. The plurality of data lines 120 are spaced apart from each other. The gate lines 104, the data lines 120 and the common line 106 cross each other to define sub-pixels P1, P2, P3 and P4. Four sub-pixels P1, P2, P3 and P4 disposed up and down and left and right form one unit pixel.

A thin film transistor T is formed at one side of each sub-pixel P1, P2, P3 and P4. The thin film transistor T includes a gate electrode 102, an active layer 112, a source electrode 116 and a drain electrode 118. The drain electrode 118 has an extension part 122, which is extended over the common line 106.

A common electrode 136, 138, 140 and 142 and a pixel electrode 132 and 134 are formed in each sub-pixel P1, P2, P3 and P4. The pixel electrode includes a horizontal portion 132 and a plurality of vertical portions 134. The horizontal portion 132 is connected to the extension part 122 through a first contact hole CH1. The plurality of vertical portions 134 are vertically extended from the horizontal portion 132.

The extension part 122 and a part of the common line 106 overlapping each other constitute a storage capacitor $C_{ST}$. A first electrode of the storage capacitor $C_{ST}$ includes the extension part 122. A second electrode of the storage capacitor $C_{ST}$ includes the part of the common line 106 that overlaps the extension part 122.

The common electrode has a first vertical part 136, a second vertical part 138, a plurality of third vertical parts 140 and a horizontal part 142. The first and second vertical parts 136 and 138 are disposed along both sides of each sub-pixel P1, P2, P3 and P4. Also, the first and second vertical parts 136 and 138 are connected to the common line 106 through second and third contact holes CH2 and CH3, respectively. The first and second vertical parts 136 and 138 are extended over two sub-pixels P1 and P3 or P2 and P4 that are vertically adjacent. The plurality of third vertical parts 140 are alternatively arranged with the vertical portions 134 of the pixel electrode. The horizontal part 142 is connected to the plurality of third vertical parts 140 and the second vertical part 138. Here, the second vertical part 138 contacts the horizontal parts 142 of both vertically adjacent sub-pixels P1 and P3 or P2 and P4, respectively.

The array substrate for the IPS-LCD device includes two sub-pixels of 6 blocks and two sub-pixels of 8 blocks. In this arrangement, two adjacent sub-pixels include 6 blocks and 8 blocks, respectively. Therefore, sub-pixels P1 and P4, which include the same number of blocks, are disposed on a diagonal line as depicted FIG. 3. Similarly, sub-pixels P2 and P3 having the same number blocks are disposed in an alternate diagonal line in the context of FIG. 3.

Table 2 lists exemplary widths of elements in designing an array substrate for the IPS-LCD device according to an embodiment of the present invention. For illustration and comparison purposes, the array substrate has a pixel of the same size as the pixel of the related art. As shown in Table 2, the data line has a width of about 12 μM as compared with 20 μm of the related art. The pixel electrode 134 has a width of about 4.0 μm. Outer vertical parts 136 and 138 of the common electrode, which overlaps the data line 120, have also a width of about 4.0 μm, except for a portion overlapping the data line 120. If the outer vertical parts 136 and 138 of the common electrode has a width of about 8.0 μm, two sub-pixels having 6 blocks and two sub-pixel having 8 blocks may be formed in a pixel of the same size as the pixel of the relate art. When two sub-pixels are considered as one unit, the unit of the related art has 12 blocks, and the unit of the present invention has 14 blocks including sub-pixels of 6 blocks and 8 blocks, respectively. Thus, an aperture ratio is improved by about 14/12=16.7%.

TABLE 2

| Blocks | 6 or 8 |
|---|---|
| Width of gate line | 16 μm |
| Width of data line | 12 μm |
| Width of pixel electrode | 4.0 μm |
| Distance between data line and common electrode | 4.0 μm |
| Width of outer common electrode | 8.0 μm |
| Space between electrodes | 12.0 μm |

Figure 4:
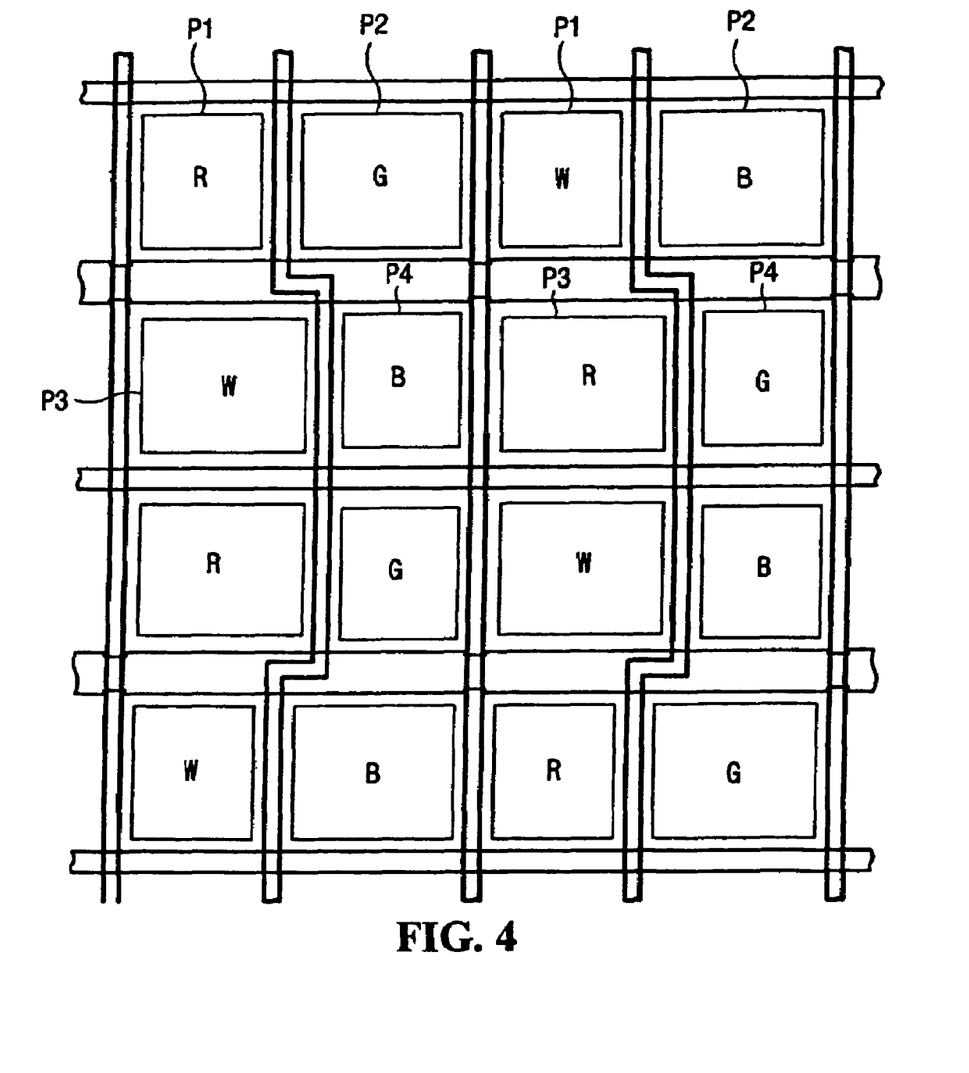
FIG. 4 is a schematic plan view of an exemplary arrangement of sub-pixels of the IPS-LCD device according to an embodiment of the present invention.

FIG. 4 is a schematic plan view of an exemplary arrangement of sub-pixels of the IPS-LCD device according to an embodiment of the present invention. In the quad type device, four sub-pixels of red, green, blue and white form one pixel, and two sub-pixels may be considered as one unit.

As shown in FIG. 4, two sub-pixels P1 and P4, each of which including 6 blocks, and two sub-pixels P2 and P3, each of which including 8 blocks, are arranged left to right, and top to bottom. The sub-pixels P1, P2, P3 and P4 constitute a pixel. If sub-pixels of the same color have the same size, in one pixel, red and blue sub-pixels have a smaller size than green and white sub-pixels, which causes a poor color balance. Alternatively, in a first pixel, the red and blue sub-pixels have a smaller size than the green and white sub-pixels, and in a second pixel, the red and blue sub-pixels have a larger size than the green and white sub-pixels.

Adjacent pixels in accordance with an embodiment of the present invention have a good color balance of red, green, blue and white. At this time, the green and white sub-pixels are disposed on a diagonal line of the pixel and a distance between sub-pixels of similar color is fixed. Accordingly, in two pixels, all colors have the same size.

Although sub-pixels of 6 blocks and 8 blocks are illustrated in the embodiments of the present invention set forth above, the number of blocks may not be limited. Thus, in the quad type device, one sub-pixel may have n blocks and the other sub-pixel may have n+2 blocks. Then, one unit consisting of two sub-pixels may have 2(n+1) blocks. The unit of 2(n+1) blocks increases a design margin and an effective aperture ratio in comparison with the unit of 2n blocks or 2(n+2) blocks.

FIGS. 5A to 5E, FIGS. 6A to 6E, and FIGS. 7A to 7E illustrate a manufacturing method of the array substrate for the IPS-LCD device according to an embodiment of the present invention. FIGS. 5A to 5E are exemplary cross-sectional views along the line V-V of FIG. 3 according to an embodiment of the present invention. FIGS. 6A to 6E are exemplary cross-sectional views along the line VI-VI of FIG. 3 according to an embodiment of the present invention. FIGS. 7A to 7E are exemplary cross-sectional views along the line VII-VII of FIG. 3 according to an embodiment of the present invention.

Figure 5A:
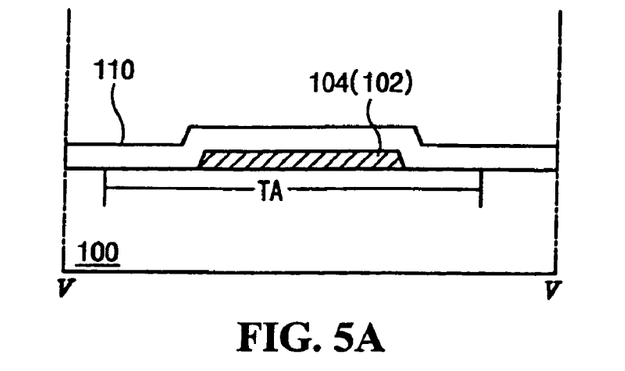
Figure 6A:
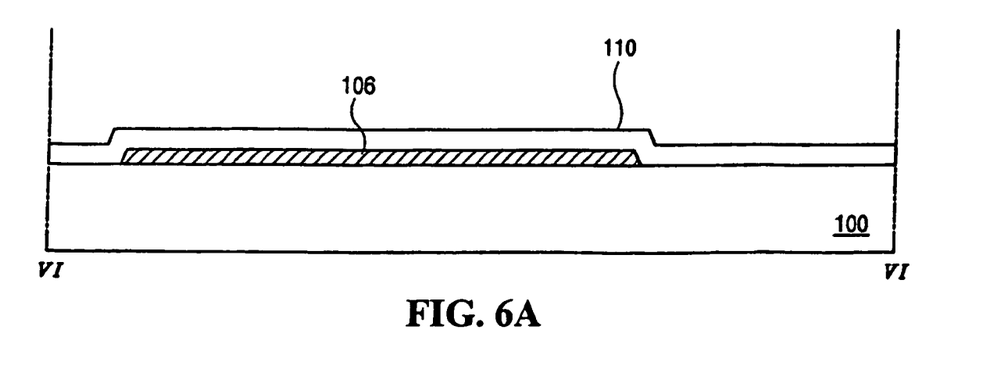
Figure 7A:
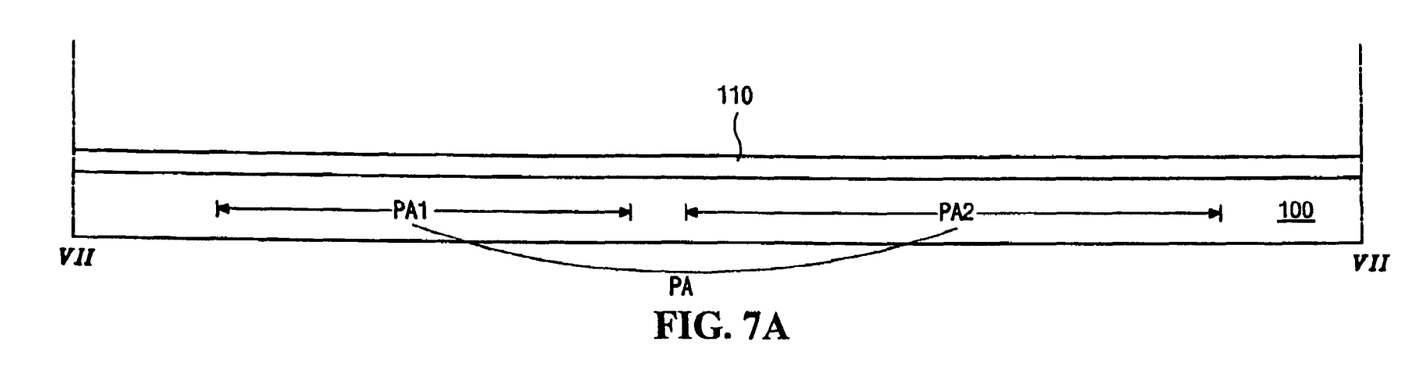

As shown in FIGS. 5A, 6A and 7A, a metal material, such as aluminum (Al) or aluminum alloy, is deposited on a substrate, on which a switching area TA and a pixel area PA are defined, and then is patterned, thereby forming a gate line 104. The gate line 104 is formed along a side of horizontally adjacent sub pixels PA1 and PA2. The gate line 104 of the switching area TA represents a gate electrode 102. A common line 106 is simultaneously formed with the gate line 104. The common line 106 is spaced apart from and parallel to the gate line 104.

Next, a gate insulating layer 110 is formed on an entire surface of the substrate 100 including the gate line 104 and the common line 106 thereon by depositing an inorganic material selected from a group including silicon nitride (SiNx) and silicon oxide ($SiO_2$).

Figure 5B:
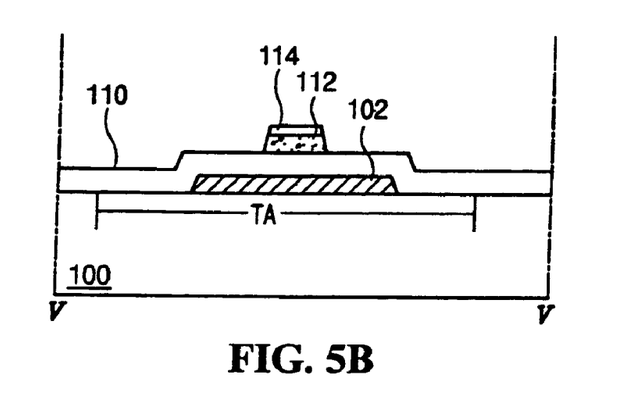
Figure 6B:
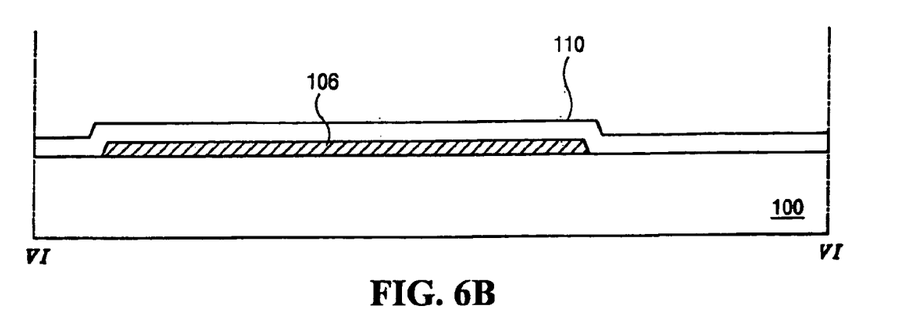
Figure 7B:
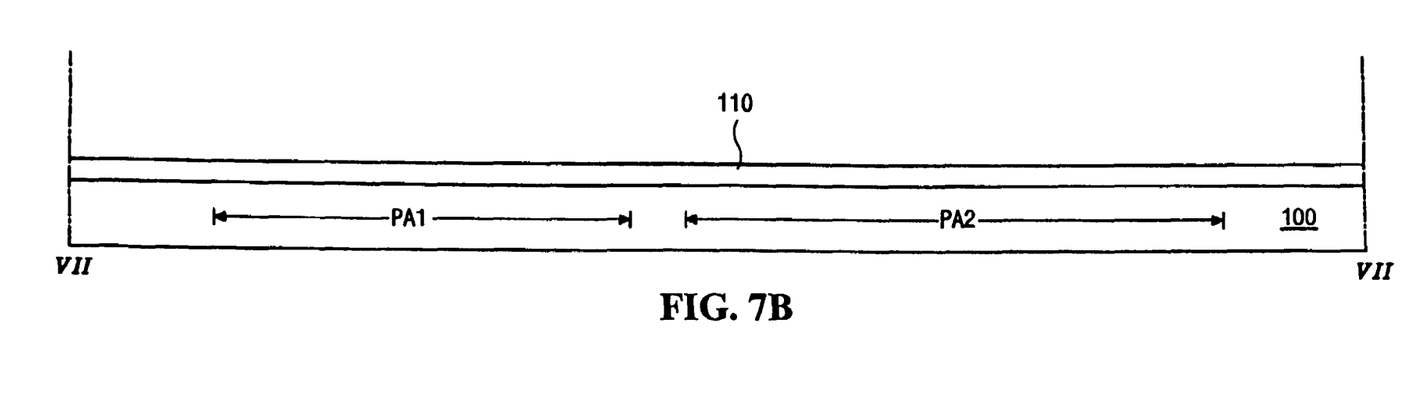

As shown in FIGS. 5B, 6B and 7B, amorphous silicon (a-Si:H) and doped amorphous silicon (n+a-Si:H) are deposited on the gate insulating layer 110. Then, the deposited amorphous silicon and doped amorphous silicon are patterned to form an active layer 112 and an ohmic contact layer 114 over the gate electrode 102.

Figure 5C:
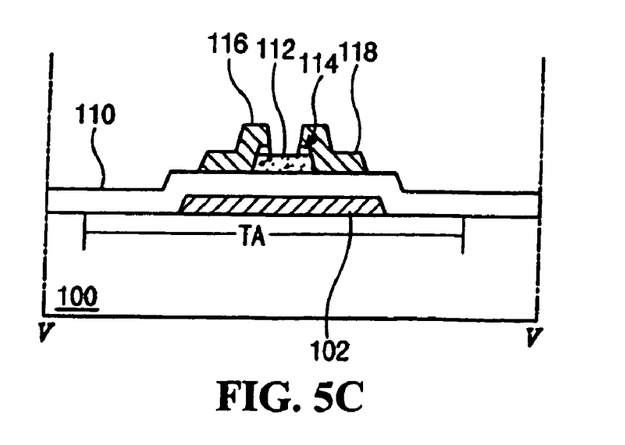
Figure 6C:
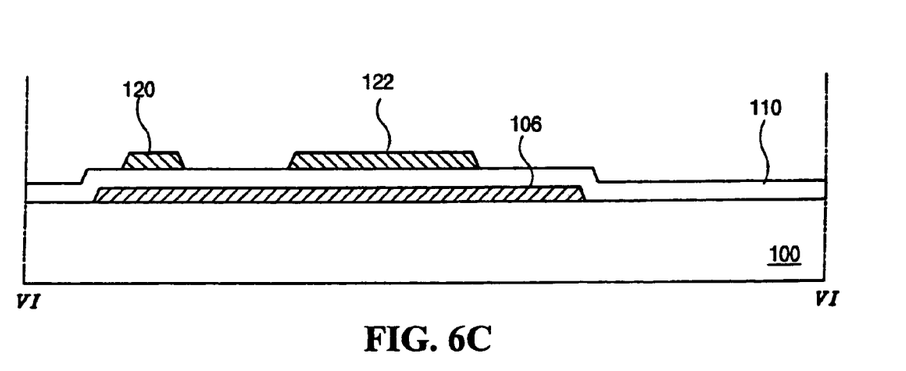
Figure 7C:
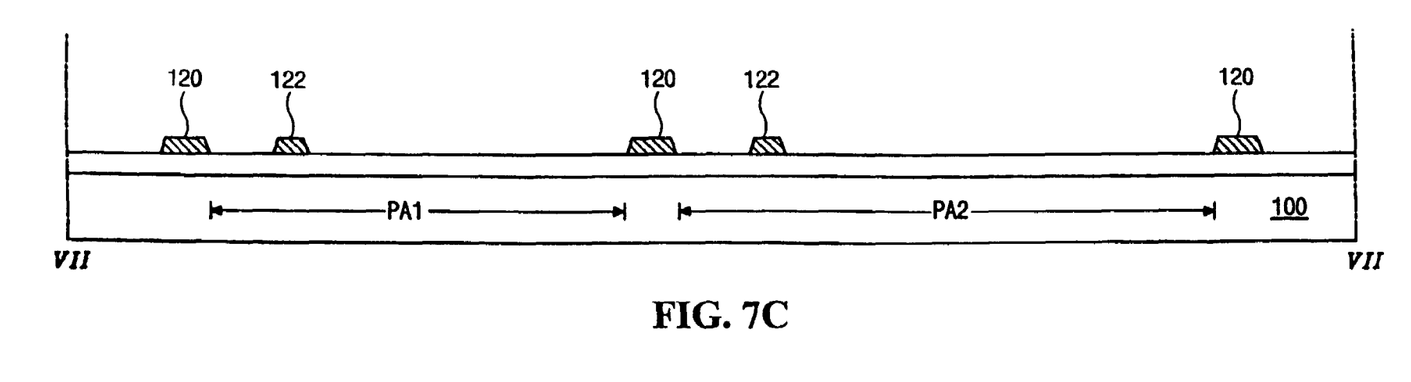

As shown in FIGS. 5C, 6C and 7C, a conductive material is selected from a conductive metal group including chromium (Cr), molybdenum (Mo), tungsten (W), titanium (Ti), and copper (Cu). The conductive material is deposited on an entire surface of the substrate 100 including the active layer 112 and the ohmic contact layer 114. Then, the deposited conductive material is patterned.

Thus, a source electrode 116, a drain electrode 118 and a data line 120 are formed. The source electrode 116 and the drain electrode 118 are spaced apart from each other over the active layer 112. The data line 120 is connected to the source electrode 116, and perpendicularly crosses the gate line 104 to define the pixel area PA1 or PA2. The drain electrode 118 includes an extension part 122, which is extended over the common line 106 passing through the pixel area PA1 or PA2. Here, the ohmic contact layer is also patterned by using the source and drain electrodes 116 and 118 as an etch mask to thereby expose the active layer 112.

Figure 5D:
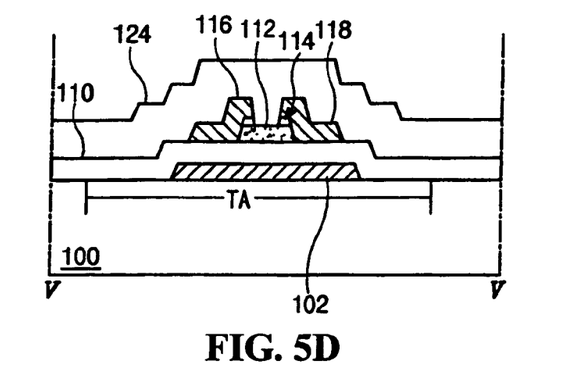
Figure 6D:
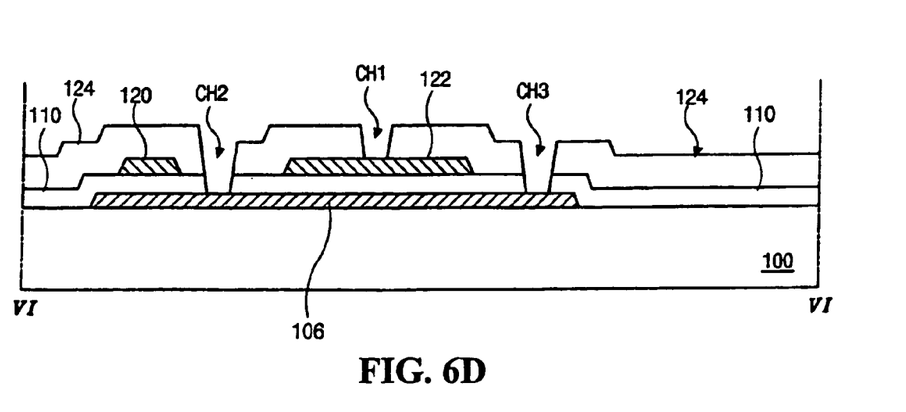
Figure 7D:
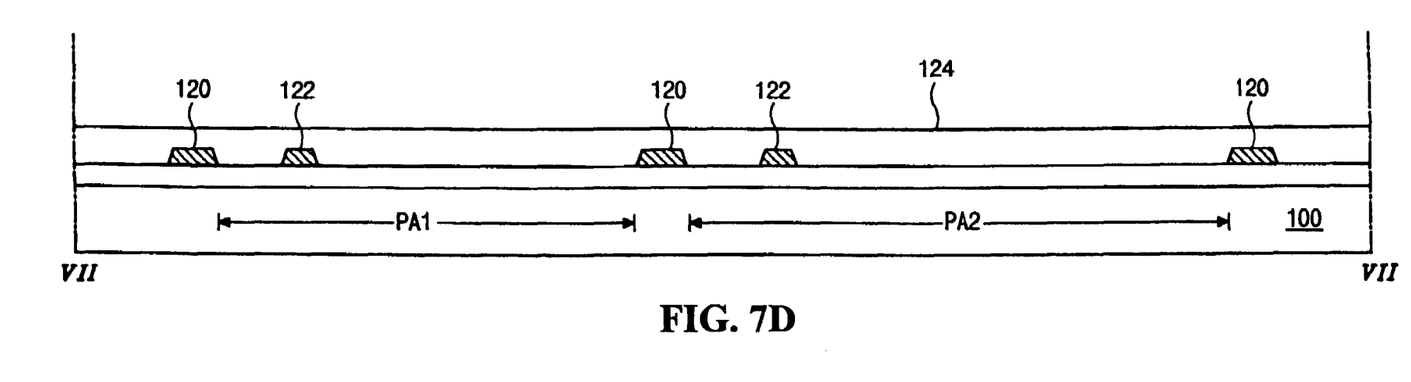

As shown in FIGS. 5D, 6D and 7D, a passivation layer 124 is formed by coating an organic material having a relatively low dielectric constant, such as benzocyclobutene (BCB) and acrylic resin, is coated on an entire surface of the substrate 100 including the source and drain electrodes 116 and 118 and the data line 120 thereon, and then is patterned to form a first contact hole CH1, a second contact hole CH2 and a third contact hole CH3. The first contact hole CH1 exposes the extension part 122 of the drain electrode 120. The second and third contact holes CH2 and CH3 expose two sides of the common line 106 in one sub-pixel.

Figure 5E:
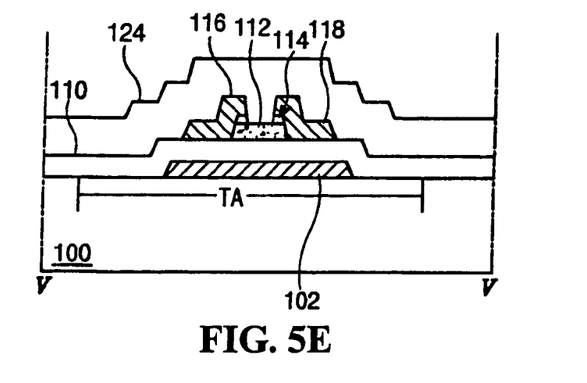
Figure 6E:
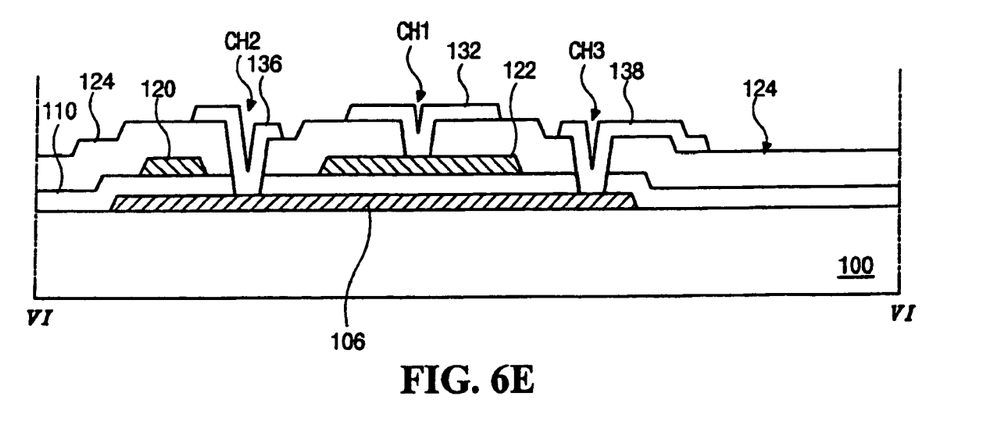
Figure 7E:
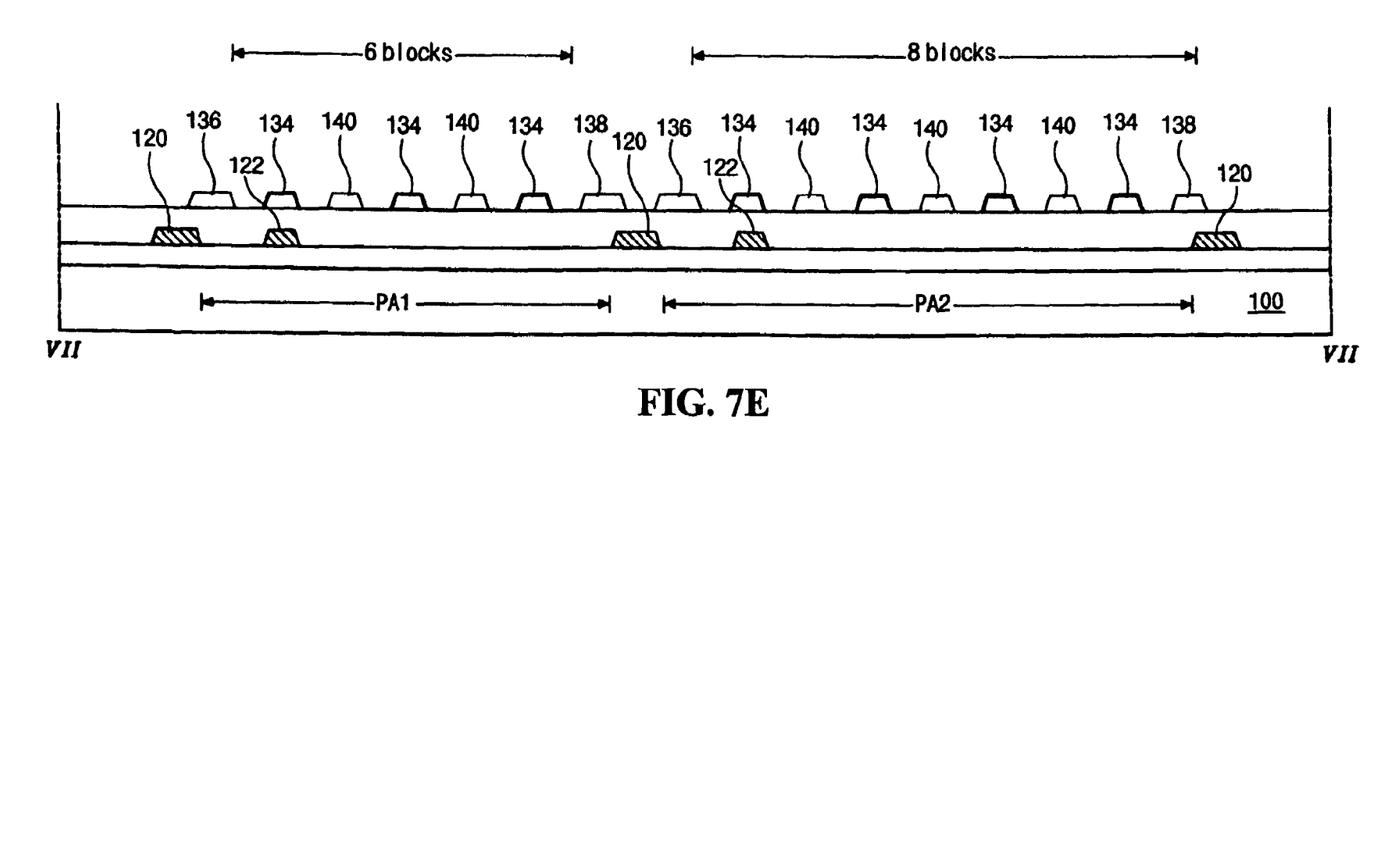

As shown in FIGS. 5E, 6E and 7E, one transparent conductive material selected from a group including indium-tin-oxide (ITO) and indium-zinc-oxide (IZO) is deposited on an entire surface of the substrate 100 including the passivation layer 124. Then, the transparent conductive material is patterned to thereby form a pixel electrode and a common electrode.

The pixel electrode includes a horizontal portion 132 that is connected to the extension part 122 of the drain electrode 118 through the first contact hole CH1. The pixel electrode further includes a plurality of vertical portions 134 that are vertically extended from the horizontal portion 132 in the pixel area.

The common electrode includes a first vertical part 136, a second vertical part 138, a plurality of third vertical parts 140, and a horizontal part 142. The first vertical part 136 and the second vertical part 138 are close to respective data lines 120 at both sides of the sub-pixel PA1 or PA2. The first and second vertical parts 136 and 138 are connected to the common line 106 through the second and third contact holes CH2 and CH3, respectively. The third vertical parts 140 are alternatively arranged with the vertical portions 134 of the pixel electrode in the pixel area PA1 or PA2. The horizontal part 142 connects the third vertical parts 140 and the second vertical part 138.

The first vertical part 136 and the second vertical part 138 of the common electrode are formed over two sub-pixels P1 and P3 or P2 and P4 of FIG. 3. The sub-pixels P1, P2, P3 and P4 of FIG. 3 are arranged up and down and left and right to form a quad type structure. Two sub-pixels have 6 blocks and two sub-pixels have 8 blocks, wherein sub-pixels having the same number of blocks are disposed in a diagonal line.

According to an embodiment of the present invention, the unit consisting of two sub-pixels has 14 blocks. Such a unit of 14 blocks increases a design margin of the lines and the electrodes, thus resulting in an increased aperture ratio. Here, the distances between the electrodes have the same value as those of the related art and the data line and the pixel electrode have effective values.

Figure 8:
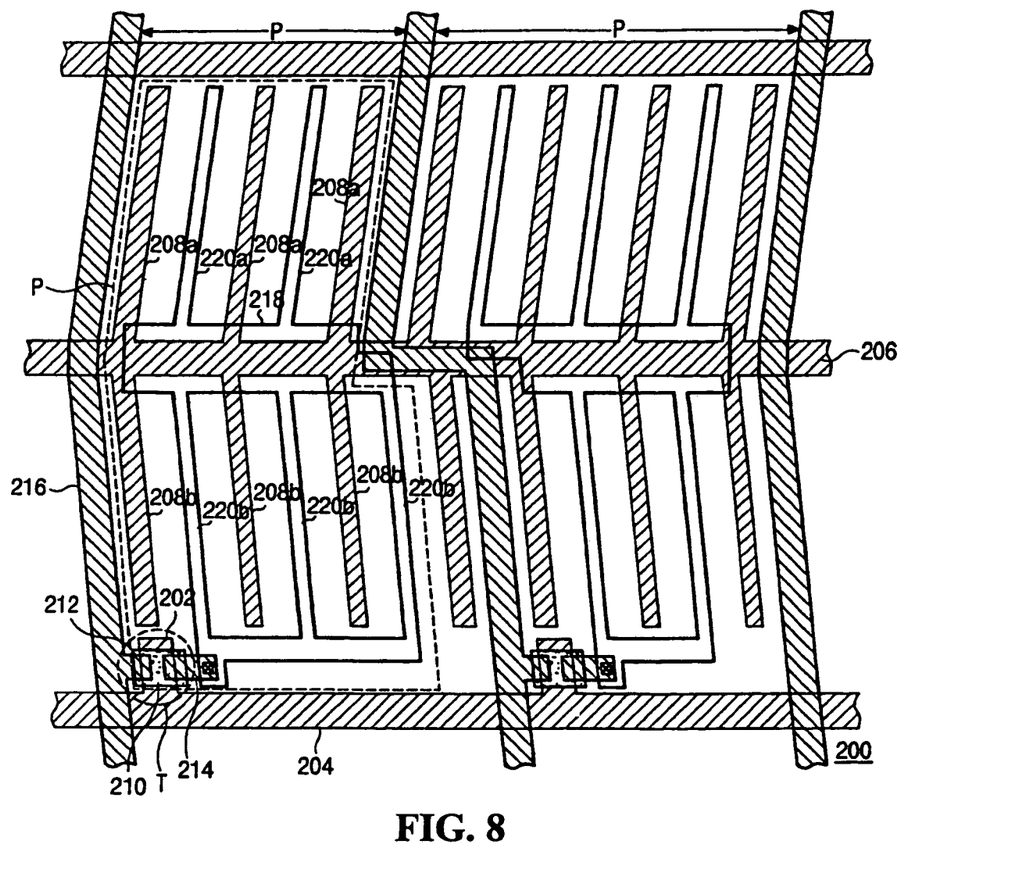
FIG. 8 is a plan view of an exemplary array substrate for an IPS-LCD device according to an embodiment of the present invention.

FIG. 8 is a plan view of an exemplary array substrate for an IPS-LCD device according to an embodiment of the present invention. This embodiment includes two sub-pixels of 4 blocks and two sub-pixels of 6 blocks. As shown in FIG. 8, a plurality of gate lines 204 is formed in a first direction on a substrate 200. A plurality of data lines 216 is formed in a second direction perpendicular to the gate lines 204. The data lines 216 cross the gate lines 204 to define a pixel region P. A common line 206 is formed between adjacent gate lines 204 and is parallel to the gate line 204.

A thin film transistor T is formed at a crossing of the gate and data lines 204 and 216. The thin film transistor T includes a gate electrode 202, an active layer 210, a source electrode 212 and a drain electrode 214. The gate electrode 202 is connected to the gate line 204 and the source electrode 212 is connected to the data line 216. The drain electrode 214 is spaced apart from the source electrode 212 over the gate electrode 202.

A common electrode 208a and 208b and a pixel electrode 218, 220a, and 220b are formed in the pixel region P. The pixel electrode includes a horizontal portion 218 overlapping the common line 206, a plurality of first vertical portions 220a disposed in an upper side of the pixel region P, and a plurality of second vertical portions 220b disposed in a lower side of the pixel region P. The first vertical portions 220a and the second vertical portions 220b have a predetermined angle with respect to the horizontal portion 218. The second vertical portions 220b are symmetrical to the first vertical portions 220a with respect to the horizontal portion 218. A part of the plurality of second vertical portions 220b is connected to the drain electrode 214.

The common electrode includes a plurality of first vertical parts 208a and a plurality of second vertical parts 208b. The first vertical parts 208a extend from the common line 206 in the upper side of the pixel region P and are alternatively parallel arranged with the plurality of first vertical portions 220a of the pixel electrode. The second vertical parts 208b extend from the common line 206 in the lower side of the pixel region P and are alternatively arranged parallel with the second vertical portions 220b of the pixel electrode. The second vertical parts 208b are symmetrical to the first vertical parts 208a with respect to the common line 206.

In this embodiment, vertical parts 208a and 208b of the common electrode and the vertical portions 220a and 220b of the pixel electrode are slightly tilted and symmetric with respect to the first direction, which is the direction of the common line 206 or the horizontal portion 218 of the pixel electrode. The pixel region P includes 2 domains, which have symmetric arrangements of liquid crystal molecules. The above structure results in optical compensation to prevent color shift and increases viewing angles.

Four (4) blocks are formed in a first area of the pixel region P, which is the upper side of the pixel region P. Six (6) blocks are formed in a second area of the pixel region P, which is the lower side of the pixel region P. The number of blocks may vary.

The data line 216 may have a width of about 10 µm. The common electrode 208a and 208b near the data line 216 may have a width of about 10 µm. Other common electrode 208a and 208b and the pixel electrode 220a and 220b may have a width of about 5 µm. At this time, if one area of the pixel region P comprises 2 blocks, each block, i.e., a space between the electrodes, may have a width of about 35 µm. If one area of the pixel region P is composed of 4 blocks, one block may have a width of about 15 µm. If one area of the pixel region P is composed of 6 blocks, one block may have a width of about 8.3 µm.

Because one block has an average width of about 11 µm obtained from 15 µm of 4 blocks and 8.3 µm of 6 blocks in the second embodiment including 4 and 6 blocks, the second embodiment has wider transmission areas than the related art, in which one block has an average width of about 8.3 µm.

If all areas of one pixel region have 6 blocks, spaces between the electrodes are 12×8.3 µm=99.6 µm. On the other hand, if two areas of one pixel region, respectively, have 6 blocks and 4 blocks, spaces between the electrodes are 10×11 µm=110 µm. Thus, the space of about 10.4 µm in the unit pixel may be further used as an aperture area. At this time, an effective space between the electrodes is about 10.5 µm, which corresponds to an approximate value.

Therefore, a sub-pixel having 6 blocks and 4 blocks has a wider transmissive area than a sub-pixel having 6 blocks up and down to obtain high brightness. Since the array substrate for the quad-type IPS-LCD device according to an embodiment of the present invention has sub-pixels of 8 blocks and 6 blocks arranged up and down and left and right, wherein the sub-pixels of the same blocks are disposed on a diagonal line, high brightness may be obtained due to an increased aperture area.

In a general R, G and B arrangement, one sub-pixel has a first area of 6 blocks and a second area of 4 blocks, and thus spaces between the electrodes may be wider. Additionally, because one sub-pixel has two domains, better improved viewing angles may be obtained.

It will be apparent to those skilled in the art that various modifications and variations can be made in embodiments the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching liquid crystal display device, comprising:
   gate lines arranged in a first direction on a substrate;
   data lines crossing the gate lines to define a pixel region;
   a switching element at a crossing of the gate and data lines;
   a pixel electrode in the pixel region; and
   a common electrode alternatively arranged with the pixel electrode,
   wherein the pixel region consists of first and second areas divided by a straight line parallel to the first direction, and the first area of the pixel region consists of an n-number of blocks (n is natural number) and the second area of the pixel region consists of an (nα2)-number of blocks, wherein the straight line is one of a common line and a horizontal portion of the pixel electrode, and
   wherein the first area of the pixel region is adjacent to a third area of a next pixel region along the first direction, and the second area of the pixel region is adjacent to a fourth area of the next pixel region along the first direction, wherein the fourth area of the next pixel region consists of an n-number of blocks and the third area of the next pixel region consists of an (n+2)-number of blocks.

2. The array substrate of claim 1, wherein the switching element includes a thin film transistor including a gate electrode, an active layer, a source electrode and a drain electrode.

3. The array substrate of claim 1, wherein the pixel electrode includes a horizontal portion, a plurality of first vertical portions and a plurality of second vertical portions, wherein the horizontal portion is parallel to the gate lines, and the plurality of first and second vertical portions are slightly tilted with respect to the horizontal portion and are symmetric to each other with respect to the horizontal portion.

4. The array substrate of claim 1, wherein parts of the common electrode are adjacent to the data line.

5. An array substrate for an in-plane switching liquid crystal display device, comprising:

gate lines on a substrate;

data lines crossing the gate lines to define pixel regions;

a switching element at each crossing of the gate and data lines;

a pixel electrode in each of the pixel regions;

a common electrode alternatively arranged with the pixel electrode, wherein each of the pixel regions consists of first and second areas, and the first area consists of an n-number of blocks (n is natural number) and the second area consists of an (n+2)-number of blocks, wherein (2m)th data line (m is natural number) includes a portion parallel to the gate lines between adjacent gate lines, and wherein the first and second areas are divided by a straight line overlapping the portion of the (2m)th data line.

6. The array substrate of claim 5, wherein the straight line is one of a common line and a horizontal portion of the pixel electrode.

* * * * *